US005755298A

United States Patent [19]

Langford, Jr. et al.

[11] Patent Number: 5,755,298

[45] Date of Patent: May 26, 1998

[54] HARDFACING WITH COATED DIAMOND PARTICLES

[75] Inventors: James W. Langford, Jr., Red Oak, Tex.; Robert Delwiche, Brussels, Belgium

[73] Assignee: Dresser Industries, Inc., Dallas, Tex.

[21] Appl. No.: 818,468

[22] Filed: Mar. 12, 1997

Related U.S. Application Data

[60] Provisional application No. 60/001,868, Aug. 3, 1995

[62] Division of Ser. No. 579,454, Dec. 27, 1995.

[51] Int. Cl.[6] .......... E21B 10/46

[52] U.S. Cl. .......... 175/374; 175/425; 175/435

[58] Field of Search .......... 175/371, 374, 175/432, 434, 425, 426, 428; 428/544, 533, 557

[56] References Cited

U.S. PATENT DOCUMENTS

| | | | |
|---|---|---|---|
| Re. 34,435 | 11/1993 | Warren et al. | 175/398 |
| 2,660,405 | 11/1953 | Scott et al. | 255/347 |
| 2,804,282 | 8/1957 | Spengler, Jr. | 255/345 |
| 3,003,370 | 10/1961 | Coulter, Jr. | 76/108 |
| 3,389,761 | 6/1968 | Ott | 175/374 |
| 3,461,983 | 8/1969 | Hudson et al. | 175/375 |
| 3,497,942 | 3/1970 | Weiss | 29/470 |
| 3,575,247 | 4/1971 | Feenstra | 175/329 |
| 3,640,356 | 2/1972 | Feenstra | 175/329 |
| 3,650,714 | 3/1972 | Farkas | 51/295 |
| 3,747,699 | 7/1973 | Feenstra et al. | 175/329 |
| 3,757,878 | 9/1973 | Wilder et al. | 175/329 |
| 3,768,984 | 10/1973 | Foster, Jr. | 29/182.8 |
| 3,800,891 | 4/1974 | White et al. | 175/374 |
| 3,841,852 | 10/1974 | Wilder et al. | 51/295 |
| 3,858,671 | 1/1975 | Kita et al. | 175/410 |
| 3,871,840 | 3/1975 | Wilder et al. | 51/295 |
| 3,888,405 | 6/1975 | Jones et al. | 228/2 |
| 3,922,038 | 11/1975 | Scales | 308/8.2 |
| 3,986,842 | 10/1976 | Quaas | 29/191.2 |
| 3,990,525 | 11/1976 | Penny | 175/337 |
| 4,006,788 | 2/1977 | Garner | 175/330 |
| 4,037,673 | 7/1977 | Justman | 175/371 |
| 4,048,705 | 9/1977 | Blanpain et al. | 29/420 |
| 4,054,426 | 10/1977 | White | 51/309 |
| 4,067,490 | 1/1978 | Jones et al. | 228/102 |
| 4,102,419 | 7/1978 | Klima | 175/371 |

(List continued on next page.)

OTHER PUBLICATIONS

International Search Report for PCT/US96/12462 dated Nov. 7, 1996.

Security/Dresser "Security Oilfield Catalog" Rock Bits, Diamond Products, Drilling Tools, *Security Means Technology*, Nov. 1991.

Security/DBS "PSF Premium Steel Tooth Bits with TECH2000™ Hardfacing" 5M/4/95–SJ © 1995 Dresser Industries, Inc.

Security/DBS "PSF MPSF with Diamond Tech2000 Hardfacing" © 1995 Dresser Industries, Inc.

*Primary Examiner*—Frank Tsay

*Attorney, Agent, or Firm*—Baker & Botts, L.L.P.

[57] ABSTRACT

Hardfacing to protect wear surfaces of drill bits and other downhole tools having coated diamond particles dispersed within and bonded to a metallic matrix deposit. The coating on the diamond particles may be formed from materials and alloys such as particles, tungsten carbide, and tungsten carbide/cobalt and cermets such as metal carbides and metal nitrides. The coated diamond particles are preferably sintered and have a generally spherical shape. The coated diamond particles are pre-mixed with selected materials such that welding and cooling will form both a metallurgical bond and a mechanical bond within the solidified metallic matrix deposit. A welding rod is prepared by placing a mixture of coated diamond particles, hard particles such as tungsten carbide/cobalt, and loose filler material into a steel tube. A substrate is hardfaced by progressively melting the welding rod onto a selected surface of the substrate and allowing the melted material to solidify, forming the desired hardfacing with coated diamond particles dispersed therein on the substrate surface.

15 Claims, 5 Drawing Sheets

U.S. PATENT DOCUMENTS

| | | | |
|---|---|---|---|
| 4,109,737 | 8/1978 | Bovenkerk | 175/329 |
| 4,117,968 | 10/1978 | Naidich et al. | 228/124 |
| 4,140,189 | 2/1979 | Garner | 173/329 |
| 4,148,368 | 4/1979 | Evans | 175/329 |
| 4,156,329 | 5/1979 | Daniels et al. | 51/295 |
| 4,173,457 | 11/1979 | Smith | 51/309 |
| 4,173,685 | 11/1979 | Weatherly | 428/556 |
| 4,176,723 | 12/1979 | Arceneaux | 175/329 |
| 4,182,394 | 1/1980 | Cason, Jr. | 164/4 |
| 4,207,954 | 6/1980 | Jerome | 175/330 |
| 4,228,214 | 10/1980 | Steigelman et al. | 428/212 |
| 4,262,761 | 4/1981 | Crow | 175/374 |
| 4,265,324 | 5/1981 | Morris et al. | 175/329 |
| 4,274,840 | 6/1981 | Housman | 51/307 |
| 4,285,409 | 8/1981 | Allen | 175/336 |
| 4,359,335 | 11/1982 | Garner | 75/208 |
| 4,376,793 | 3/1983 | Jackson | 427/34 |
| 4,398,952 | 8/1983 | Drake | 419/18 |
| 4,442,909 | 4/1984 | Radtke | 175/329 |
| 4,499,959 | 2/1985 | Grappendorf et al. | 175/330 |
| 4,562,892 | 1/1986 | Ecer | 175/371 |
| 4,592,433 | 6/1986 | Dennis | 175/329 |
| 4,593,776 | 6/1986 | Salesky et al. | 175/375 |
| 4,597,456 | 7/1986 | Ecer | 175/371 |
| 4,602,691 | 7/1986 | Weaver | 175/329 |
| 4,608,226 | 8/1986 | Lauvinerie et al. | 419/5 |
| 4,630,692 | 12/1986 | Ecer | 175/330 |
| 4,640,374 | 2/1987 | Dennis | 175/393 |
| 4,666,797 | 5/1987 | Newman et al. | 428/681 |
| 4,679,640 | 7/1987 | Crawford | 175/374 |
| 4,682,987 | 7/1987 | Brady et al. | 51/293 |
| 4,688,651 | 8/1987 | Dysart | 175/371 |
| 4,694,918 | 9/1987 | Hall | 175/329 |
| 4,705,124 | 11/1987 | Abrahamson et al. | 175/410 |
| 4,708,752 | 11/1987 | Kar | 148/127 |
| 4,722,405 | 2/1988 | Langford, Jr. | 175/374 |
| 4,724,913 | 2/1988 | Morris | 175/329 |
| 4,726,432 | 2/1988 | Scott et al. | 175/375 |
| 4,726,718 | 2/1988 | Meskin et al. | 408/145 |
| 4,729,440 | 3/1988 | Hall | 175/107 |
| 4,738,322 | 4/1988 | Hall et al. | 175/329 |
| 4,770,907 | 9/1988 | Kimura | 427/217 |
| 4,781,770 | 11/1988 | Kar | 148/16.5 |
| 4,784,023 | 11/1988 | Dennis | 76/108 |
| 4,802,539 | 2/1989 | Hall et al. | 175/329 |
| 4,814,234 | 3/1989 | Bird | 428/564 |
| 4,814,254 | 3/1989 | Naito et al. | 430/203 |
| 4,836,307 | 6/1989 | Keshavan et al. | 175/374 |
| 4,869,330 | 9/1989 | Tibbitts | 175/393 |
| 4,913,247 | 4/1990 | Jones | 175/329 |
| 4,938,991 | 7/1990 | Bird | 427/190 |
| 4,943,488 | 7/1990 | Sung et al. | 428/552 |
| 4,976,324 | 12/1990 | Tibbitts | 175/329 |
| 5,025,874 | 6/1991 | Barr et al. | 175/329 |
| 5,051,112 | 9/1991 | Keshavan et al. | 51/309 |
| 5,111,895 | 5/1992 | Griffin | 175/425 |
| 5,131,480 | 7/1992 | Lockstedt et al. | 175/374 |
| 5,143,523 | 9/1992 | Matarrese | 51/293 |
| 5,147,001 | 9/1992 | Chow et al. | 175/428 |
| 5,147,996 | 9/1992 | Carlin | 219/76.14 |
| 5,152,194 | 10/1992 | Keshavan et al. | 76/108 |
| 5,154,245 | 10/1992 | Waldenstrom et al. | 175/420 |
| 5,190,796 | 3/1993 | Iacovangelo | 427/304 |
| 5,199,832 | 4/1993 | Meskin et al. | 408/145 |
| 5,205,684 | 4/1993 | Meskin et al. | 408/145 |
| 5,206,083 | 4/1993 | Raj et al. | 428/323 |
| 5,224,969 | 7/1993 | Chen et al. | 51/295 |
| 5,230,718 | 7/1993 | Oki et al. | 51/293 |
| 5,232,469 | 8/1993 | McEachron et al. | 51/295 |
| 5,236,116 | 8/1993 | Solanski et al. | 228/178 |
| 5,248,006 | 9/1993 | Scott et al. | 175/420 |
| 5,250,086 | 10/1993 | McEachron et al. | 51/309 |
| 5,250,355 | 10/1993 | Newman et al. | 428/367 |
| 5,261,477 | 11/1993 | Brunet et al. | 164/97 |
| 5,273,125 | 12/1993 | Jurewicz | 175/420 |
| 5,279,374 | 1/1994 | Sievers et al. | 175/374 |
| 5,279,375 | 1/1994 | Tibbitts et al. | 175/428 |
| 5,282,512 | 2/1994 | Besson et al. | 175/374 |
| 5,282,513 | 2/1994 | Jones | 175/434 |
| 5,287,936 | 2/1994 | Grimes et al. | 175/331 |
| 5,291,807 | 3/1994 | Vanderford et al. | 76/108 |
| 5,303,785 | 4/1994 | Duke | 175/57 |
| 5,308,367 | 5/1994 | Julien | 51/293 |
| 5,314,033 | 5/1994 | Tibbitts | 175/431 |
| 5,316,095 | 5/1994 | Tibbitts | 175/429 |
| 5,328,763 | 7/1994 | Terry | 428/559 |
| 5,335,738 | 8/1994 | Waldenstrom et al. | 175/420 |
| 5,337,844 | 8/1994 | Tibbitts | 175/434 |
| 5,341,890 | 8/1994 | Cawthorne et al. | 175/374 |
| 5,346,026 | 9/1994 | Pessier et al. | 175/331 |
| 5,348,108 | 9/1994 | Scott et al. | 175/432 |
| 5,348,770 | 9/1994 | Sievers et al. | 427/422 |
| 5,351,768 | 10/1994 | Scott et al. | 175/374 |
| 5,351,770 | 10/1994 | Cawthorne et al. | 175/374 |
| 5,351,771 | 10/1994 | Zahradnik | 175/374 |
| 5,353,885 | 10/1994 | Hooper et al. | 175/378 |
| 5,355,750 | 10/1994 | Scott et al. | 76/108 |
| 5,370,195 | 12/1994 | Keshavan et al. | 175/420 |
| 5,405,573 | 4/1995 | Clark et al. | 419/35 |
| 5,425,288 | 6/1995 | Evans | 76/108 |
| 5,429,200 | 7/1995 | Blackman et al. | 175/371 |
| 5,437,343 | 8/1995 | Cooley et al. | 175/431 |
| 5,452,771 | 9/1995 | Blackman et al. | 175/353 |
| 5,609,286 | 3/1997 | Anthon | 228/56.3 |
| 5,633,084 | 5/1997 | Hiraiwa et al. | 428/403 |

FIG. 4
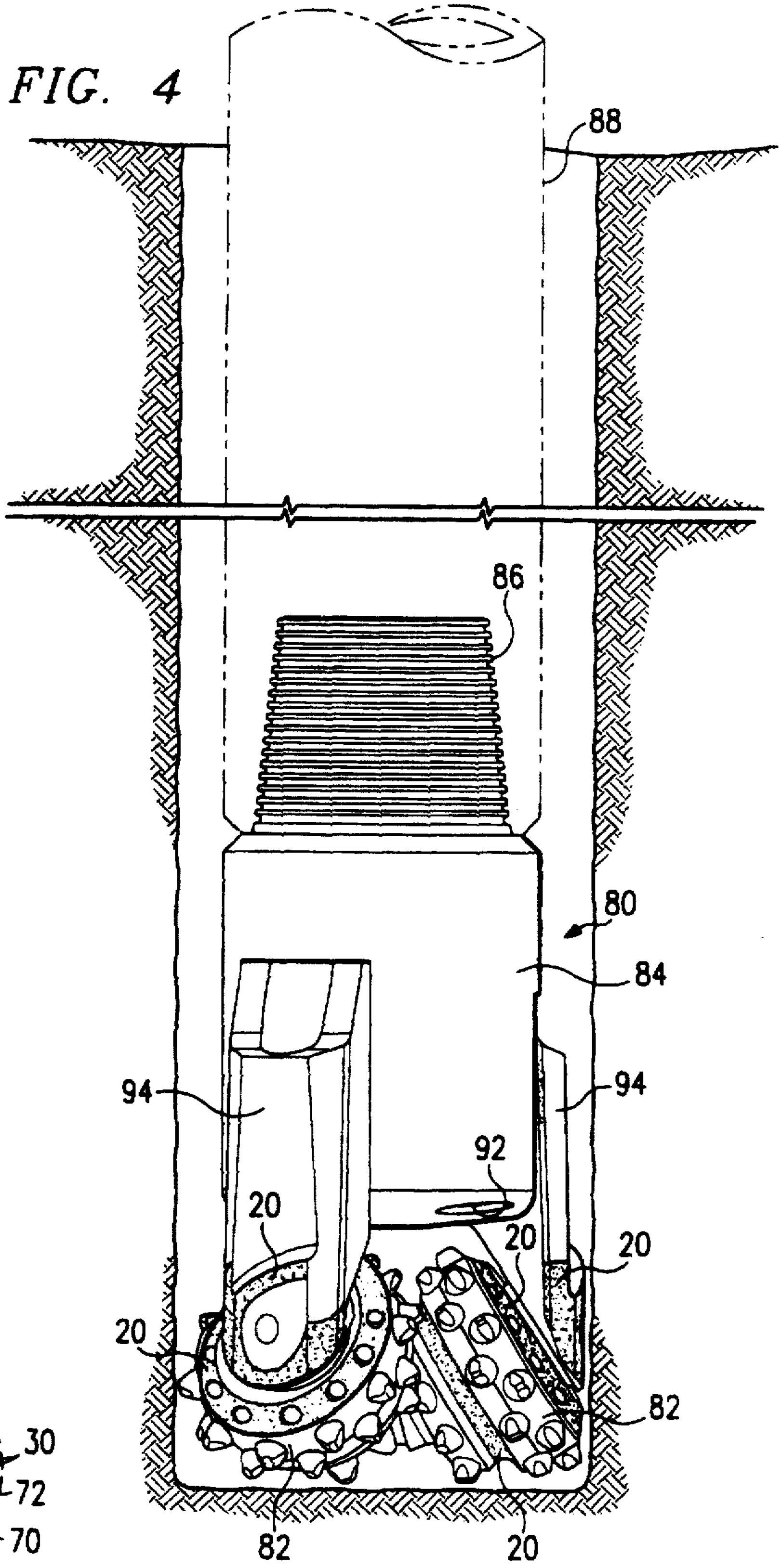
FIG. 3A
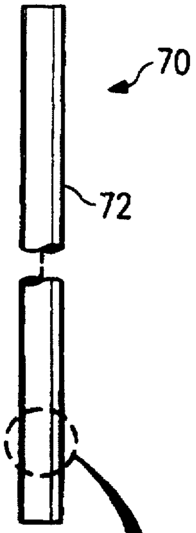
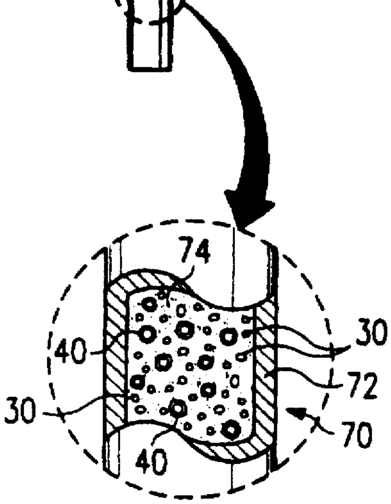
FIG. 3B

HARDFACING WITH COATED DIAMOND PARTICLES

CROSS REFERENCE TO RELATED APPLICATIONS

This application is a divisional application of U.S. application Ser. No. 08/579,454, filed Dec. 27, 1995 and entitled "Hardfacing with coated Diamond Particles", pending.

TECHNICAL FIELD OF THE INVENTION

The present invention relates in general to forming a layer of hardfacing material having coated or encrusted diamonds dispersed within a metallic matrix deposit and, more particularly, to an improved hardfacing to protect drill bits and other downhole tools.

BACKGROUND OF THE INVENTION

Hardfacing of metal surfaces and substrates is a well-known technique to minimize or prevent erosion and abrasion of the metal surface or substrate. Hardfacing can be generally defined as applying a layer of hard, abrasion resistant material to a less resistant surface or substrate by plating, welding, spraying or other well known deposition techniques. Hardfacing is frequently used to extend the service life of drill bits and other downhole tools used in the oil and gas industry. Tungsten carbide and its various alloys are some of the more widely used hardfacing materials to protect drill bits and other downhole tools.

Hardfacing is typically a mixture of a hard, wear-resistant material embedded in a metallic matrix deposit which is preferably fused with the surface of a substrate by forming metallurgical bonds to ensure uniform adherence of the hardfacing to the substrate. For some applications, the wear-resistant material such as an alloy of tungsten carbide and/or cobalt is placed in a steel tube which serves as a welding rod during welding of the hardfacing with the substrate. This technique of applying hardfacing is sometimes referred to as "tube rod welding." Tungsten carbide/cobalt hardfacing applied with tube rods has been highly successful in extending the service life of drill bits and other downhole tools.

Rotary cone drill bits are often used for drilling boreholes for the exploration and production of oil and gas. This type of bit typically employs three rolling cone cutters, also known as rotary cone cutters, rotatably mounted on spindles extending from support arms of the bit. The cutters are mounted on respective spindles that extend downwardly and inwardly with respect to the bit axis so that the conical sides of the cutters tend to roll on the bottom of a borehole and contact the formation.

For some applications, milled teeth are formed on the cutters to wear in those areas that engage the bottom and peripheral wall of the borehole during the drilling operation. The service life of milled teeth may be improved by the addition of tungsten carbide particles to hard metal deposits on certain wear areas of the milled teeth. This operation is sometimes referred to as "hardfacing." U.S. Pat. No. 4,262,761, issued Apr. 21, 1981 discloses the application of hardfacing to milled teeth and is incorporated by reference for all purposes within this application.

For other applications, sockets may be formed in the exterior of the cutters and hard metal inserts placed in the sockets to wear in those areas that engage the bottom and peripheral wall of a borehole during the drilling operation. The service life of such inserts and cutters may be improved by carburizing the exterior surface of the cutters. U.S. Pat. No. 4,679,640 issued on Jul. 14, 1987 discloses one procedure for carburizing cutters and is incorporated by reference for all purposes within this application.

A wide variety of hardfacing materials have been satisfactorily used on drill bits and other downhole tools. A frequently used hardfacing includes sintered tungsten carbide particles in an alloy steel matrix deposit. Other forms of tungsten carbide particles may include grains of monotungsten carbide, ditungsten carbide and/or macrocrystalline tungsten carbide. Satisfactory binders may include materials such as cobalt, iron, nickel, alloys of iron and other metallic alloys. The loose hardfacing material is generally placed in a hollow tube or welding rod and applied to the substrate using conventional welding techniques. As a result of the welding process, a matrix including both steel alloy melted from the substrate surface and steel alloy provided by the welding rod or hollow tube is formed with the hardfacing. Various alloys of cobalt, nickel and/or steel may be used as part of the binder for the matrix. Other heavy metal carbides and nitrides, in addition to tungsten carbide, have been used to form hardfacing.

Both natural and synthetic diamonds have been used in downhole drill bits to provide cutting surfaces and wear-resistant surfaces. U.S. Pat. No. 4,140,189 teaches the use of diamond inserts protruding from the shirttail surface of a roller cone bit. Polycrystalline diamond (PCD) gauge inserts are frequently used on a wide variety of drill bits to prevent erosion and wear associated with harsh downhole drilling conditions. U.S. Pat. No. 4,140,189 is incorporated by reference for all purposes within this application.

SUMMARY OF THE INVENTION

In accordance with the present invention, the disadvantages and problems associated with previous hardfacing materials have been substantially reduced or eliminated. One aspect of the present invention includes providing a drill bit with layers of hardfacing having coated diamond particles with the resulting hardfacing being able to better withstand abrasion, wear, erosion and other stresses associated with repeated downhole use in a harsh environment.

One of the technical advantages of the present invention includes providing a layer of hardfacing material on selected portions of a drill bit to prevent undesired abrasion and/or erosion of the protected is portions of the drill bit. One aspect of the present invention includes placing a layer of hardfacing having coated diamond particles on the exterior surfaces of milled teeth to prevent premature wear of the milled teeth during downhole drilling and to substantially extend the life of the associated drill bit.

Another aspect of the present invention includes mixing coated diamond particles with conventional tube rod compositions to provide an enhanced hardfacing surface on a substrate. For one embodiment of the present invention, each milled tooth on a rotary cone drill bit is completely covered with a layer of hardfacing material which includes coated diamond particles in accordance with the teachings of the present invention. The coated diamond particles are preferably sintered prior to mixing with the other materials which will be used to form the layer of hardfacing on the substrate.

Technical advantages of the present invention include placing a metallic matrix coating on a diamond particle and sintering the metallic matrix coating to form chemical or metallurgical bonds between the metallic matrix coating and the surface of the diamond particle. Varying the composition of the metallic matrix coating and/or sintering the metallic matrix coating can also be used to vary the density of the resulting coated diamond particle to be equal to or greater than the density of the hard materials used to form the metallic matrix deposit when the hard materials are in their molten state. The metallic matrix coating on the diamond particle can also be reinforced with small grains of boride, carbide, oxide and/or nitride which cooperate with the other components of the metallic matrix coating to improve retention of the diamond particle within the metallic matrix coating during abrasion of the associated hardfacing.

The metallic matrix deposit is preferably applied to a substrate by hardfacing techniques which form chemical or metallurgical bonds between the surface of the substrate and the metallic matrix deposit, and between the metallic matrix deposit and the metallic matrix coating on each diamond particle.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3A and 3B are schematic drawings in elevation and in section with portions broken away showing a hollow welding rod with a filler having coated diamond particles and other hard materials disposed therein in accordance with the teachings of the present invention;

FIG. 4 is a schematic drawing in section and in elevation showing a drill bit with hardfacing in accordance with the teachings of the present invention;

DETAILED DESCRIPTION OF THE INVENTION

The preferred embodiments of the present invention and its advantages are best understood by referring to FIGS. 1–10 of the drawings, like numerals being used for like and corresponding parts of the various drawings.

Since machining wear resistant material is both difficult and expensive, it is common practice to form a metal part with a desired configuration and subsequently treat the surface by directly hardening the metal part (carburizing and nitriding) or by applying a layer of wear resistant material (hardfacing) to the surface depending upon the amount of wear resistance desired. For applications when resistance to extreme wear of a working surface of a metal part or substrate is required, hardfacing such as metallic matrix deposit 20 having a layer of hard, wear resistant material formed in accordance with the present invention may be applied to working surface 22 to protect the underlying substrate 24.

Figure 5:
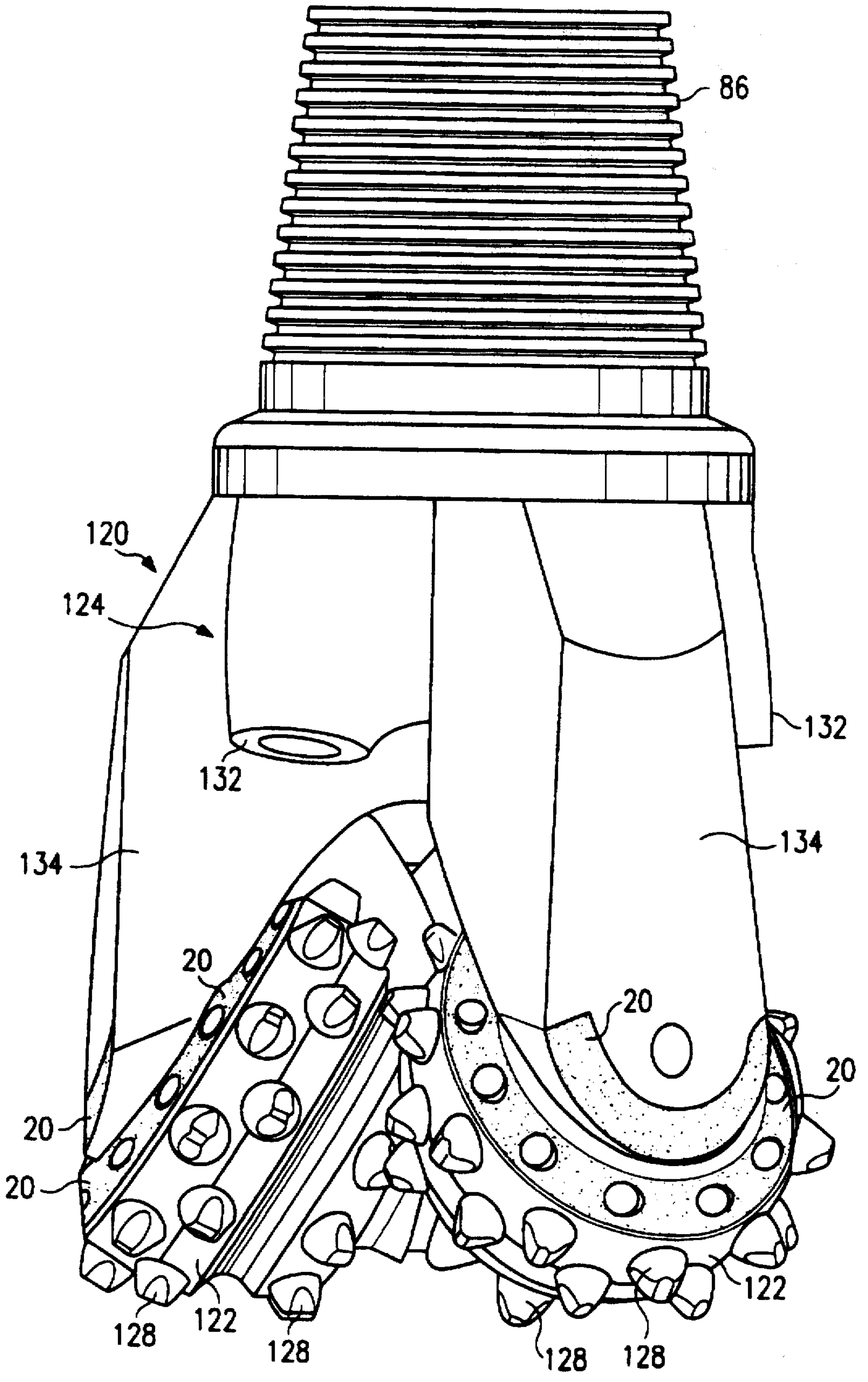
FIG. 5 is an isometric drawing showing another type of drill bit with hardfacing in accordance with the teachings of the present invention.
Figure 8:
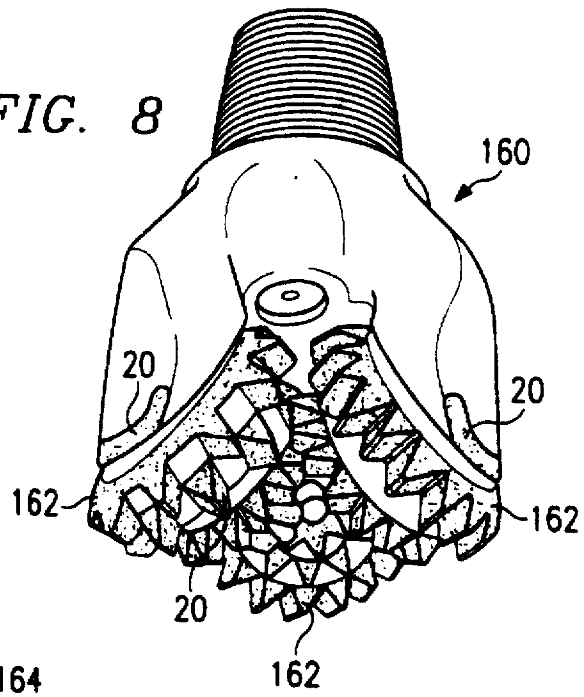
FIG. 8 is an isometric drawing showing a schematic view of a rotary cone drill bit having milled teeth with layers of hardfacing in accordance with the teaching of the present invention.

Substrate 24 may be formed from a wide variety of metal alloys having desirable metallurgical characteristics such as machinability, toughness, heat treatability, and corrosion resistance. For example, substrate 24 may be formed from the various steel alloys associated with the manufacture of drill bits 80, 120 and 160 as shown in FIGS. 4, 5 and 8. For purposes of illustration, substrate 24 and hardfacing 20 will be described with respect to various types of downhole drill bits. However, hardfacing 20 incorporating teachings of the present invention may be formed on any surface of a wide variety of tools such as saws, chisels, plows, fluid flow control equipment or other articles of manufacture which require protection from abrasion, erosion and/or wear.

As discussed later in more detail, metallic matrix deposit or hardfacing 20 may include a wide variety of hard materials and hard particles plus coated diamond particles or diamond pellets 40. The hard materials and/or hard particles used to form metallic matrix deposit 20 would provide a wear resistant layer of material even without the addition of coated diamond particles 40. As a result of the present invention which includes the use of coated diamond particles 40, metallic matrix deposit 20 has significantly enhanced wear resistance and abrasion resistance as compared to prior hardfacing materials.

Figure 1:
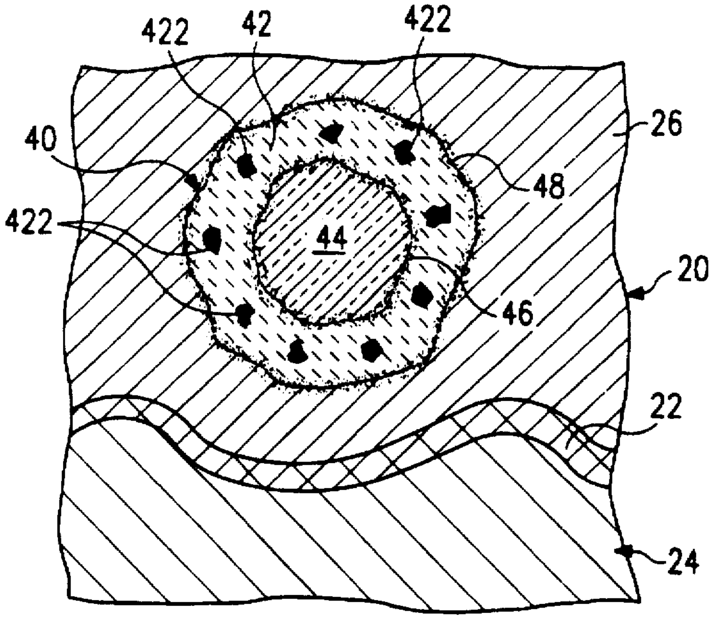
FIG. 1 is an enlarged schematic drawing in section with portions broken away showing a coated diamond particle dispersed within and bonded to a metallic matrix deposit in accordance with an embodiment of the present invention.
Figure 2:
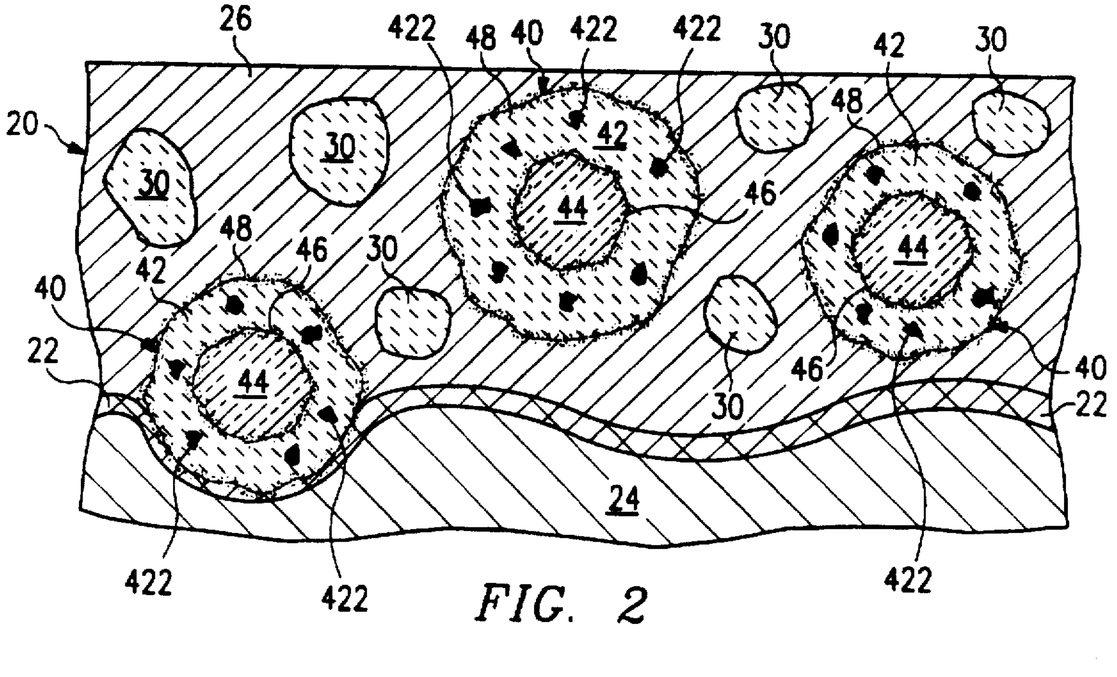
FIG. 2 is a schematic drawing in section with portions broken away showing coated diamond particles dispersed within and bonded to a metallic matrix deposit to form hardfacing on a substrate in accordance with an embodiment of the present invention.

Metallic matrix deposit 20 as shown in FIGS. 1 and 2 includes a plurality of carbide particles 30 and coated diamond particles 40 embedded or encapsulated in matrix portion 26. Various materials including cobalt, copper, nickel, iron, and alloys of these elements may be used to form matrix portion 26. From time to time matrix portion 26 may also be referred to as binder matrix 26.

For purposes of the present application, the term "metallic matrix deposit" is used to refer to a layer of hardfacing which has been applied to a metal substrate to protect the substrate from abrasion, erosion and/or wear. Various binders such as cobalt, nickel, copper, iron and alloys thereof may be used to form the matrix portion or binder matrix of the deposit. Various metal alloys and cermets such as metal borides, metal carbides, metal oxides and metal nitrides may be included as part of the metallic matrix deposit in accordance with the teachings of the present invention. Some of the more beneficial metal alloys and cermets will be discussed later in more detail.

For purposes of the present application, the terms "chemical bond" and "metallurgical bond" are used to refer to strong attractive forces that hold together atoms and/or molecules in a crystalline or metallic structure.

For purposes of the present application, the term "metallic matrix coating" is used to refer to a layer of hard material which has been metallurgically bonded to the exterior of a diamond or diamond particle. The metallic matrix coating is preferably formed from sinterable materials including various metal alloys and cermets such as metal borides, metal carbides, metal oxides and metal nitrides. Some of the more beneficial metal alloys and cermets which may be used to form a metallic matrix coating on a diamond particle in accordance with the teachings of the present invention will be discussed later in more detail.

For purposes of the present application, the term "tungsten carbide" includes monotungsten carbide (WC), ditungsten carbide ($W_2C$), macrocrystalline tungsten carbide and cemented or sintered tungsten carbide. Sintered tungsten carbide is typically made from a mixture of tungsten carbide and cobalt powders by pressing the powder mixture to form a green compact. Various cobalt alloy powders may also be included. The green compact is then sintered at temperatures near the melting point of cobalt to form dense sintered tungsten carbide.

Depending upon the intended application for metallic matrix deposit 20, the various types of tungsten carbide may be used to form all or a portion of metallic matrix coating 42 on diamond particles 44, tungsten carbide particles 30 and/or matrix portion 26 of metallic matrix deposit 20. An important feature of the present invention includes the ability to select the type of hard material which will provide the desired abrasion, wear, and erosion resistance in an efficient, cost-effective, reliable manner.

Each coated diamond particle 40 includes metallic matrix coating 42, which has been metallurgically bonded to exterior 46 of the respective diamond particle 44. Preferably, exterior surface 46 of each diamond particle 44 will be completely covered by metallic matrix coating 42. For some operating environments metallic matrix deposit 20 may perform satisfactorily with less than one hundred percent (100%) coating on each diamond particle 44. Coated diamond particles 40 may sometimes be referred to as diamond pellets.

Diamond particle 44 may be either a synthetic diamond or a natural diamond. Also, each diamond particle 44 may be a whole diamond, only a portion of a diamond or a polycrystalline diamond. For some applications, diamond particles 44 are selected with a mesh range of sixty to eighty U.S. Mesh.

Depending upon the intended application for metallic matrix deposit or hardfacing 20, each diamond particle 44 may be selected within the same mesh range. For other applications, coated diamond particles 40 may be formed from diamond particles 44 selected from two or more different mesh ranges. The resulting coated diamond particles 40 will preferably have approximately the same exterior dimensions. However, by including diamond particles 44 with different mesh ranges, the wear, erosion and abrasion resistance of the resulting metallic deposit matrix 20 may be modified to accommodate the specific operating environment associated with substrate 24.

Diamond particles 44 may be coated using various techniques such as those described in U.S. Pat. No. 4,770,907 entitled "Method for Forming Metal-Coated Abrasive Grain Granules" and U.S. Pat. No. 5,405,573 entitled "Diamond Pellets and Saw Blade Segments Made Therewith." Both of these patents are incorporated by reference for all purposes within this application.

The hard material used to form metallic matrix coating 42 and the thickness of metallic matrix coating 42 may be varied depending upon the intended application for metallic matrix deposit 20. Coating 42 is preferably formed from material which can be sintered to provide a relatively dense layer which fully encapsulates the respective diamond particle 44. If coating 42 is not applied, diamond particles 44 may be damaged by the temperatures required by many hardfacing techniques to bond matrix portion 26 with surface 22 of substrate 24. Encapsulating or cladding diamond particles 44 with coating 42 protects the respective diamond particle 44 from the heat associated with the selected hardfacing procedures. Also, without coating 42, diamond particles 44 have a tendency to float to the surface of molten welding materials.

Coating 42 is preferably sintered after being placed on the respective diamond particle 44. The sintering process is used to form coated diamond particles 40 having a density which is equal to or greater than the density of matrix portion 26 in its molten state. Varying the composition of metallic matrix coating 42 can also be used to vary the density of the resulting coated diamond particle 40. Thus, coated diamond particles 40 will be uniformly dispersed within metallic matrix deposit 20 or will sink to the bottom and contact surface 22 of substrate 24 depending upon the density established by the sintering process.

The material used to form metallic matrix coating 42 is selected to be metallurgically and chemically compatible with the material used to form matrix portion 26. For many applications, the same material or materials used to form coating 42 will also be used to form matrix portion 26. For other applications coating 42 can also be reinforced with small grains 422 formed from boride, carbide, oxide, and/or nitride materials.

Metallurgical bonds are preferably formed between exterior 48 of each metallic matrix coating 42 and matrix portion 26. As a result of the metallurgical or chemical bond coated diamond particles 40 remain fixed within metallic matrix deposit 20 until the adjacent hard materials represented by matrix portion 26 have been worn away. Thus, the present invention results in securely anchoring each diamond particle 44 within metallic matrix deposit 20.

Metallic matrix deposit 20 may be formed on and bonded to working surface 22 of substrate 24 using various techniques associated with conventional tungsten carbide hardfacing. As a result of the present invention, coated diamond particles 40 may be incorporated into a wide variety of hardfacing materials without requiring any special techniques or application procedures.

For many applications, metallic matrix deposit 20 is preferably applied by welding techniques associated with conventional hardfacing. During the welding process, surface 22 of substrate 24 is sufficiently heated to melt portions of substrate 24 and form metallurgical bonds between matrix portion 26 and substrate 24. In FIGS. 1 and 2 surface 22 is shown with a varying configuration and width to represent the results of the welding process and resulting metallurgical bond. During the welding process, portions of metallic matrix coating 42 on one or more coated diamond particles 40 may also be metallurgically bonded with substrate 24 at surface 22.

Tube rod welding with an oxyacetylene torch (not shown) may be satisfactorily used to form metallurgical bonds between metallic matrix deposit 20 and substrate 24 and metallurgical bonds between matrix portion 26 and coating 42. For other applications, laser welding techniques may be used to form metallic matrix deposit 20 on substrate 24. Both tube rod welding techniques and laser welding techniques will be described later in more detail.

For some less stringent applications, metallic matrix deposit 20 may be formed on substrate 24 using plasma spray techniques and/or flame spray techniques, which are both associated with tungsten carbide and other types of hardfacing. Plasma spray techniques typically form a mechanical bond between the hardfacing and the substrate. Flame spraying techniques also typically form a mechanical bond between the hardfacing and the substrate. For some applications, a combination of flame spraying and plasma spraying techniques will form a metallurgical bond between metallic matrix deposit 20 and substrate 24. In general, hardfacing techniques which produce a metallurgical bond are preferred over those techniques which provide only a mechanical bond between metallic matrix deposit 20 and substrate 24.

For still other applications coated diamond particles 40 may be glued or attached to surface 22 of substrate 24 using water-glassed techniques. Various types of hardfacing materials in powder form may then be applied over the coated diamond particles 44 to provide matrix portion 26 of metallic matrix deposit 20. By sintering coated diamond particles 40 and/or varying the composition of metallic matrix coating 42 to have the desired density, metallic matrix deposit 20 may be formed by any of the techniques suitable for applying hardfacing to substrate 24 and coated diamond particles 40 will be dispersed throughout the resulting metallic matrix deposit 20.

Coated diamond particles 40 provide a very high level of wear and abrasion resistance for the underlying substrate 24. As the surrounding matrix portion 26 undergoes wear and abrasion, both tungsten carbide particles 30 and coated diamond particles 40 will be exposed. The inherently high wear resistance of the newly exposed coated diamond particles 40 and/or tungsten carbide particles 30 significantly increases the overall wear and abrasion resistance of metallic matrix deposit 20. Preferably, coated diamond particles 40 are both metallurgically bonded and mechanically bonded within matrix portion 26. Without providing metallic matrix coating 42, only relatively weak mechanical bonds would be formed between matrix portion 26 and diamond particles 44.

The ratio of coated diamond particles 40 with respect to tungsten carbide particles 30 intermixed within metallic matrix deposit 20 may be varied to provide the desired amount of abrasion and wear resistance for substrate 24 depending upon the anticipated operating environment. For some extremely harsh environments, the ratio of coated diamond particles 40 to tungsten carbide particles 30 may be 10:1. For other operating environments, the ratio may be substantially reversed. An important benefit of the present invention includes the ability to vary the amount of coated diamond particles 40 depending upon the anticipated operating environment.

Welding rod 70 formed in accordance with the teachings of the present invention for hardfacing substrate 24 to protect surface 22 from abrasion and wear is shown in FIGS. 3A and 3B. Welding rod 70 preferably includes hollow steel tube 72 which is closed at both ends to contain filler 74 therein. A plurality of coated diamond particles 40 are disposed within steel tube 72 as part of filler 74. Each coated diamond particle 40 includes diamond particles 44 with metallic matrix coating 42 bonded therewith. A plurality of tungsten carbide particles 30 may also be mixed with coated diamond particles 40 and disposed within filler 74. For some applications, filler 74 may include a deoxidizer and a temporary resin binder. Examples of deoxidizers satisfactory for use with the present invention include various alloys of iron, manganese, and silicon.

For some applications, the weight of welding rod 70 will comprise between fifty-five and eighty percent filler 74 and twenty to thirty percent steel tube 72. Filler 74 within steel tube 72 preferably includes a plurality of coated diamond particles 40 and tungsten carbide particles 30. For some applications, up to five percent of filler 74 may include deoxidizers and temporary resin binders.

Loose material such as powders of hard material selected from the group consisting of tungsten, niobium, vanadium, molybdenum, silicon, titanium, tantalum, zirconium, chromium, yttrium, boron and carbon may be included as part of filler 74. The loose material may also include a powdered mixture selected from the group consisting of copper, nickel, iron, cobalt and alloys of these elements to form matrix portion 26 of metallic matrix deposit 20. Powders of hard materials such as cermets selected from the group consisting of metal borides, metal carbides, metal oxides and metal nitrides may also be included within filler 74. The specific elements selected for filler 74 will depend upon the intended application for the resulting metallic matrix deposit 20 and the selected welding technique.

For some applications, a mixture of coated diamond particles 40, tungsten carbide particles 30 and the selected material for matrix portion 26 may be blended with an organic resin and sprayed on surface 22 of substrate 24. A laser may then be used to densify and fuse the powdered mixture with surface 22 of substrate 24 to form the desired metallurgical bonds as previously discussed. By sintering metallic matrix coating 42 and/or varying the composition of metallic matrix coating 42 to provide the desired density, coated diamond particles 40 will remain dispersed throughout metallic matrix deposit 20. U.S. Pat. No. 4,781,770 entitled "Process For Laser Hardfacing Drill Bit Cones Having Hard Cutter Inserts" shows one process satisfactory for use with the present invention. U.S. Pat. No. 4,781,770 is incorporated by reference for all purposes within this application.

Depending upon the type of hard material used to form metallic matrix coating 42, various types of sintering processes and procedures may be satisfactorily used to establish the desired density of the resulting coated diamond particles 40. Also, the ratio of the materials used to form metallic matrix coating 42 may be varied to provide the desired density. For example, when metallic matrix coating 42 is formed from tungsten carbide, the percentage of tungsten may be increased to provide a denser or heavier coating 42. Alternatively, the percentage of carbide may be decreased to provide a lighter or less dense coating 42. For other applications, small grains 422 formed from the desired boride, carbide, oxide and/or nitride materials can also be added to reduce the density of coating 42 and to improve the resulting wear, erosion and/or abrasion resistance.

When coated diamond particles 40 are mixed with tungsten carbide particles 30, preferably both particles 40 and 30 will have approximately the same density. One of the technical benefits of the present invention includes the ability to vary the density and the materials associated with metallic matrix coating 42 to ensure compatibility with tungsten carbide particles 30 and/or matrix portion 26 of metallic matrix deposit 20.

For some applications, coated diamond particles 40 have been sintered using hot isostatic pressing techniques at temperatures of approximately 1300° F. Naturally, the type of sintering, including both pressure and temperature, may be varied depending upon the materials selected to form metallic matrix coating 42 and matrix portion 26.

Metallic matrix coating 42 may be applied to each coated diamond particle 44 using various techniques such as pelletizing, chemical vapor deposition, phase vapor deposition, and/or chemical coating. The appropriate coating procedure based on the materials used to form metallic matrix coating 42 is selected to ensure that a metallurgic bond is formed between exterior surface 48 of each coated diamond particle 44 and the resulting metallic matrix coating 42.

In addition to welding rod 70, coated diamond particles 40, tungsten carbide particles 30, and the selected materials for matrix portion 26 may be included as part of a continuous welding rod or welding rope (not shown). In addition to oxyacetylene welding, atomic hydrogen welding techniques, tungsten inert gas (TIG), stick welding or SMAW and GMAW welding techniques may be satisfactorily used to apply metallic matrix deposit 20 to surface 22 of substrate 24.

Hardfacing such as metallic matrix deposit 20 formed in accordance with the teachings of the present invention may be used on a wide variety of steel bodies and substrates. For example, hardfacing 20 may be placed on roller cone drill bits, fixed cutter drill bits, sleeve for drill bits, coring bits, underreamers, hole openers, stabilizers and shock absorber assemblies. Hardfacing 20 formed in accordance with the teachings of the present invention may be used on other tools in a wide variety of industries and is not limited to downhole tools for the oil and gas industry. For purposes of explanation only, layers of hardfacing 20 formed in accordance with the teachings of the present invention are shown in FIGS. 4 through 10 on various types of rotary cone drill bits and their associated cutter cone assemblies.

The cutting action or drilling action of drill bit 80, 120 and 160 occurs as respective cutter cone assemblies 82, 122 and 162 are rolled around the bottom of the borehole by the rotation of the drill string. Cutter cone assemblies 82, 122 and 162 may sometimes be referred to as "rotary cone cutters" or "roller cone cutters." The resulting inside diameter of the borehole is established by the combined outside diameter, or gage diameter, of cutter cone assemblies 82, 122 and 162. Cutter cone assemblies 82, 122 and 162 are retained on a spindle by a conventional ball retaining system comprising a plurality of ball bearings aligned in a ball race.

Rotary cone drill bits 80, 120 and 160 are typically manufactured from a strong, ductile steel alloy, selected to have good strength, toughness and reasonable machinability. Such steel alloys do not provide good long term cutting surfaces and cutting faces on the respective cutter cone assemblies 82, 122 and 162 because such steel alloys would be rapidly worn away during downhole drilling operations. To increase the downhole service life of the respective rotary cone drill bits 80, 120 and 160, metallic deposit matrix or hardfacing 20 may be placed on shirttail surfaces, backface surfaces, milled teeth, and/or inserts associated with these respective drill bits. Metallic matrix deposit 20 may also be placed on any other portion of drill bits 80, 120 and 160 which are subjected to intense wear and abrasion during downhole drilling operations. For some applications, essentially all of the exterior surface of each cutter cone 82, 122 and 162 may be covered with metallic matrix deposit 20.

Drill bit 80 includes a bit body 84 adapted to be connected at its pin or threaded connection 86 to the lower end of rotary drill string 88. Threaded connection 86 and the corresponding threaded connection of the drill string are designed to allow rotation of drill bit 80 in response to rotation of the drill string 88 at the well surface (not shown). Bit body 84 includes a passage (not shown) that provides downward communication for drilling mud or the like passing downwardly through the drill string. The drilling mud exits through nozzle 92 and is directed to the bottom of the borehole and then passes upward in the annulus between the wall of the borehole and the drill string, carrying cuttings and drilling debris therewith.

Depending from bit body 84 are three substantially identical arms 94. Only two arms 94 are shown in FIG. 4. The lower end portion of each of the arms 94 is provided with a bearing pin or spindle (not shown), to rotatably support generally conical cutter cone assembly 82.

Drill bit 120 as shown in FIG. 5 includes bit body 124 formed by support arms 134. Bit body 124 also includes nozzles 132. Threaded connection 126 may be used to attach drill bit 120 to a rotary drill string.

Figure 6:
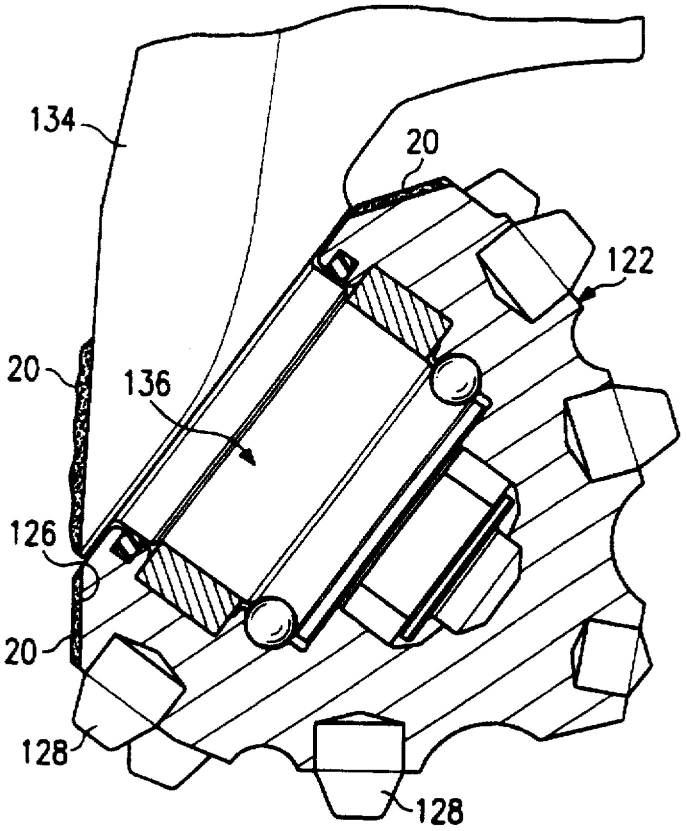
FIG. 6 is a drawing partially in section and partially in elevation with portions broken away showing a cutter cone assembly and support arm of the rotary cone bit of FIG. 5 having layers of hardfacing in accordance with the teachings of the present invention.
Figure 7:
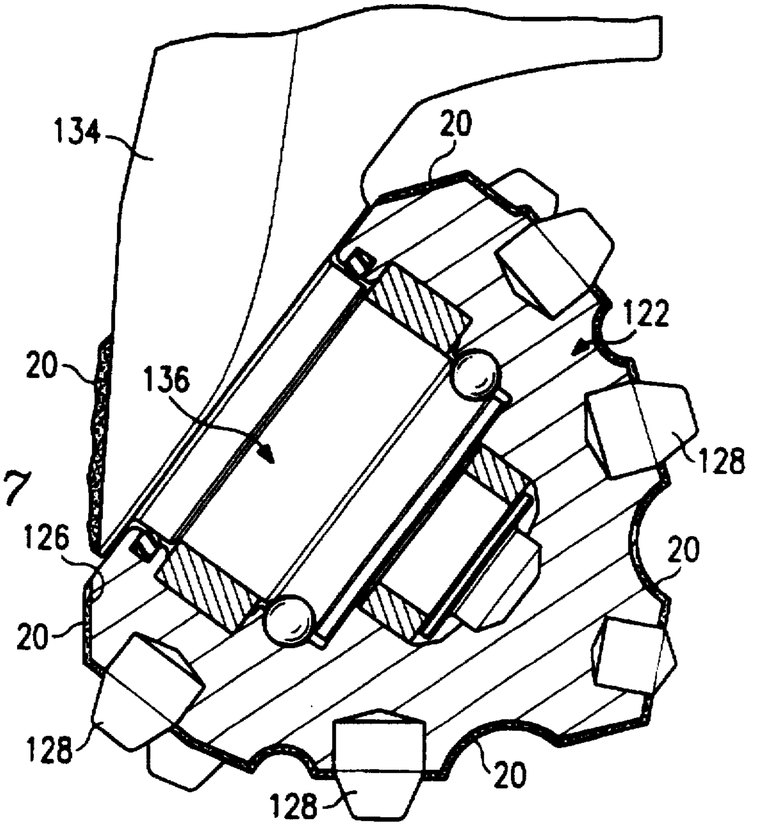
FIG. 7 is a drawing partially in section and partially in elevation with portions broken away showing the cutter cone assembly and support arm of FIG. 6 with additional layers of hardfacing in accordance with the teachings of the present invention.

FIGS. 6 and 7 show cutter cone assemblies 122 which have been rotatably mounted on spindle 136 extending from the lower portion of each support arm 134.

As shown in FIGS. 5, 6 and 7, hardfacing 20 may be placed on the exterior surface of support arms 134 adjacent to the respective cutter cone assemblies 122. This portion of support arms 134 may also be referred to as the "shirttail surface." Hardfacing 20 may also be formed on backface surface or gauge ring surface 126 of each cutter cone assembly 122. As shown in FIG. 7 the exterior surface of cutter cone assembly 122 may be completely covered with hardfacing 20 except for inserts 128.

Rotary cone drill bit 160 shown in FIG. 8 is similar to rotary cone drill bit 120 as shown in FIG. 5. The principal difference between rotary cone drill bit 160 and rotary cone drill bit 120 is the use of inserts 128 as part of cutter cone assemblies 122 as compared to milled teeth 164 provided by cutter cone assemblies 162.

Figure 9:
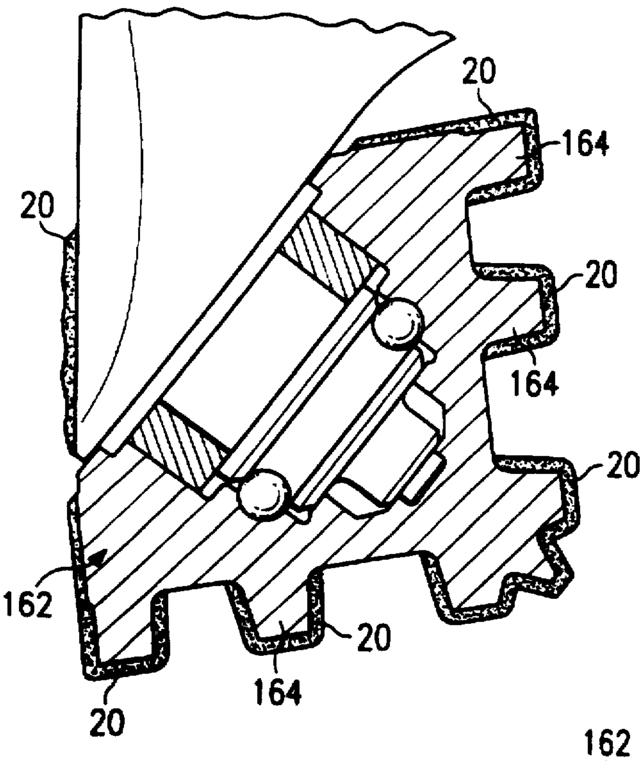
FIG. 9 is an enlarged drawing partially in section and partially in elevation with portions broken away showing a support arm and cutter cone assembly with milled teeth having layers of hardfacing in accordance with the teachings of the present invention.
Figure 10:
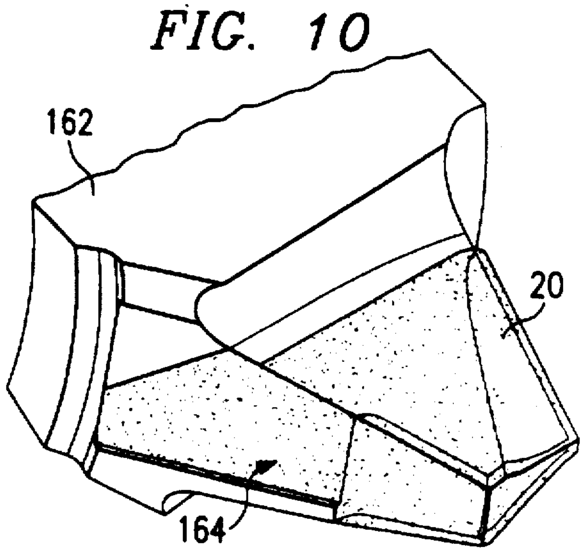
FIG. 10 is an isometric drawing with portions broken away showing a milled tooth covered with a layer of hardfacing incorporating teachings of the present invention.

Milled teeth 164 are formed on each cutter cone assembly 162 in rows along the tapered surface of each of the respective cones 162. The row closest to the support arm of each cutter cone assembly 162 is known as the back row, or gage row. As shown in FIGS. 9 and 10 metallic matrix deposit 20 is preferably applied to the exterior of each milled tooth 164 in accordance with the teachings of the present invention.

Although the present invention and its advantages have been described in detail, it should be understood that various changes, substitutions, and alterations can be made therein without departing from the spirit and scope of the invention as defined by the appended claims.

What is claimed is:

1. A rotary cone drill bit having at least one row of milled teeth with each tooth comprising;

a tip, a base, two opposing side surfaces extending between the tip and the base;

a front surface intermediate the side surfaces and extending between tip and the base;

a back surface intermediate the side surfaces and opposite the front surface;

a layer of hardfacing applied on each surface of each tooth; and the hardfacing having a plurality of coated diamond particles dispersed within and bonded to a metallic matrix deposit.

2. The rotary cone drill bit of claim 1 further comprising tungsten carbide particles mixed with the coated diamond particles.

3. The rotary cone drill bit of claim 1, wherein the density of each coated diamond particle is approximately equal to the density of the metallic matrix deposit.

4. The rotary cone drill bit of claim 1, wherein the density of each coated diamond particle is greater than the density of the metallic matrix deposit.

5. The rotary cone drill bit of claim 1, wherein the layer of hardfacing material comprising by weight percent approximately one percent to seventy-five percent coated diamond particles.

6. The rotary cone drill bit of claim 1, wherein the layer of hardfacing comprises by weight percent approximately zero percent to seventy-four percent tungsten carbide.

7. A rotary cone drill bit for forming a borehole, comprising:

a bit body having an upper end portion adapted for connection to a drill string for rotation of the bit body;

a number of support arms extending from the bit body, each of the support arms having a leading edge, a trailing edge and an exterior surface disposed therebetween;

a number of cutter cone assemblies equaling the number of support arms and rotatably mounted respectively on the support arms projecting generally downwardly and inwardly with respect to each associated support arm;

a layer of hardfacing formed on the exterior surface of each support arm; and the hardfacing having a plurality of coated diamond particles dispersed within a metallic matrix deposit.

8. A The drill bit of claim 7 further comprising:

the exterior surface of each support arm having a lower shirttail portion; and the layer of hardfacing formed on the lower shirttail portion.

9. A rotary cone drill bit for forming a borehole, the drill bit comprising:

a bit body with an upper end portion adapted for connection to a drill string for rotation about a longitudinal axis of the bit body;

a number of angularly-spaced support arms integrally formed with the bit body and depending therefrom, each of the support arms having an inside surface with a spindle connected thereto and an outer shirttail surface;

each spindle projecting generally downwardly and inwardly with respect to the longitudinal axis of the bit body and having a generally cylindrical upper end portion connected to the inside surface of the respective support arm;

a number of cutter cones equaling the number of support arms and each cutter cone respectively mounted on one of the respective spindles;

a layer of hardfacing formed on a portion of each shirttail surface; and the layer of hardfacing having a plurality of coated diamond particles dispersed within and metallurgically bonded to a metallic matrix deposit.

10. A rotary cone cutter for boring engagement with the side wall and bottom of a borehole comprising:

a generally conical metal body having a central axis, a tip having a plurality of inserts protruding therefrom and a base connected to the tip to form the body;

a cavity formed in the body along the axis and opening from the base into the tip;

an annular backface formed on an outer portion of the base; and the backface having a layer of hardfacing with a plurality of coated diamond particles dispersed within and metallurgically bonded to a metallic matrix deposit for boring engagement with the side wall of the borehole.

11. In a rotary rock bit for forming a borehole, the improvement comprising:

a generally conical cutter body with an opening at one end of the body and a cavity extending into the body from the opening for use in mounting the cutter body on the rock bit;

a tip pointed away from the cavity opening;

a base connected to the tip to partially define the cavity opening;

the base having a backface surrounding said cavity opening;

the backface having a generally frustoconical shape directed away from the tip;

a layer of hardfacing disposed on an outer portion of the base and extending over the exterior of the tip;

the layer of hardfacing having a plurality of coated diamond particles disposed within and metallurgically bonded to a metallic matrix deposit;

each coated diamond particle having a diamond particle with a coating of hard material disposed on the exterior of the diamond particle;

a plurality of metallurgical bonds formed between the exterior surface of each diamond particle and the respective hard material coating; and a plurality of metallurgical bonds formed between the metallic matrix deposit and the surface of the outer base portion and the exterior of the tip.

12. A rotary cone drill bit having at least one row of teeth with each tooth comprising:

a tip, a base, two opposing side surfaces extending between the tip and the base;

a front surface intermediate the side surfaces and extending between the tip and the base;

a back surface intermediate the side surfaces and opposite the front surface;

a layer of hardfacing applied on each surface of each tooth; and the hardfacing having a plurality of coated diamond particles dispersed within and bonded to a metallic matrix deposit.

13. The rotary cone drill bit of claim 12 further comprising the teeth formed in part from steel.

14. A drill bit manufactured in part from a strong, ductile steel alloy comprising:

at least one cutting surface formed from the strong, ductile steel alloy;

a layer of hardfacing applied on the at least one cutting surface; and the hardfacing having a plurality of coated diamond particles dispersed within and bonded to a metallic matrix deposit.

15. The drill bit of claim 14 selected from the group consisting of rotary cone drill bits, fixed cutter drill bits, coring bits, underreamers, and hole openers.

* * * * *